US008194392B2

(12) United States Patent
Malhan et al.

(10) Patent No.: US 8,194,392 B2
(45) Date of Patent: Jun. 5, 2012

(54) CERAMIC MATERIAL AND ELECTRONIC DEVICE

(75) Inventors: Rajesh Kumar Malhan, Nagoya (JP); Naohiro Sugiyama, Nagoya (JP); Yuji Noguchi, Tokyo (JP); Masaru Miyayama, Tokyo (JP)

(73) Assignees: Denso Corporation, Kariya (JP); The Univeristy of Tokyo, Tokyo (JP)

( * ) Notice: Subject to any disclaimer, the term of this patent is extended or adjusted under 35 U.S.C. 154(b) by 164 days.

(21) Appl. No.: 12/830,517

(22) Filed: Jul. 6, 2010

(65) Prior Publication Data

US 2011/0002083 A1 Jan. 6, 2011

(30) Foreign Application Priority Data

Jul. 6, 2009 (JP) ................................. 2009-159705

(51) Int. Cl.
 *H01G 4/06* (2006.01)
(52) U.S. Cl. ............... 361/321.4; 361/321.2; 361/321.5; 361/311; 361/313; 361/306.1; 501/134; 501/135; 501/136; 501/138; 501/139
(58) Field of Classification Search .............. 361/321.4, 361/301.2, 301.4, 309–311, 306.1, 306.3, 361/321.2, 321.5; 501/134–139
See application file for complete search history.

(56) References Cited

U.S. PATENT DOCUMENTS

| | | | | |
|---|---|---|---|---|
| 6,226,172 B1 * | 5/2001 | Sato et al. | ...................... | 361/311 |
| 6,522,521 B2 * | 2/2003 | Mizuno et al. | ............. | 361/321.4 |
| 6,699,809 B2 * | 3/2004 | Fujikawa et al. | ............. | 501/138 |
| 6,829,137 B2 * | 12/2004 | Konaka et al. | ............. | 361/321.4 |
| 8,092,706 B2 * | 1/2012 | Uraki et al. | ............ | 252/62.9 PZ |
| 2007/0158608 A1 | 7/2007 | Feltz et al. | | |
| 2008/0067898 A1 | 3/2008 | Aoki et al. | | |
| 2008/0290316 A1 | 11/2008 | Katayama et al. | | |
| 2009/0020726 A1 | 1/2009 | Uraki et al. | | |
| 2009/0036293 A1 | 2/2009 | Shimada et al. | | |

OTHER PUBLICATIONS

Office Action dated on Apr. 4, 2011 issued in the corresponding Swedish Patent Application No. 1050733-3 (English translation enclosed).
Ogihara, H. et al. Weakly Coupled Relaxor Behavior of $BaTiO_3$-$BiScO_3$ Ceramics. J. Am Ceram. Soc., 92 [1] 110-118 (Jan. 2009).
Kumar, M. et al. Spontaneous magnetic moment in $BiFeO_3$-$BaTiO_3$ solid solutions at low temperatures. Journal of Magnetism and Magnetic Materials 188 (1998) 203-212.
A D Hilton and B W Ricketts, "Dielectric properties of $Ba_{1-x}SR_xTiO_3$ Ceramics", *J. Phys. D: Appl. Phys.*, 29, 1996, pp. 1321-1325. (discussed on p. 1 of the specification).
Office Action dated Jan. 3, 2012 issued in corresponding German Patent Application No. 102010031004.2 (and English translation).

(Continued)

*Primary Examiner* — Nguyen T Ha
(74) *Attorney, Agent, or Firm* — Posz Law Group, PLC

(57) ABSTRACT

A ceramic material has a perovskite structure and is represented by formula of $(1-x)ABO_3$-$xYZO_3$. In the formula, "x" is a real number that is greater than 0 and is less than 1 each of "A," "B," "Y," and "Z" is one or more kinds selected from a plurality of metal ions M other than a Pb ion and alkali metal ions, "A" is bivalent, "B" is tetravalent, "Y" is trivalent or combination of trivalent metal ions, and "Z" is bivalent and/or trivalent metal ions, or a bivalent and/or pentavalent metal ions.

23 Claims, 10 Drawing Sheets

OTHER PUBLICATIONS

Huang, C. and David P. Cann. "Phase transitions and dielectric properties in Bi(Zn$_{1/2}$Ti$_{1/2}$)O$_3$-BaTiO$_3$ perovskite solid solutions." *Journal of Applied Physics* 104.024117 (Jul. 2008).

Ogihara, H. et al. "High-Energy Density Capacitors Utilizing 0.7 BaTiO$_3$-0.3 BiScO$_3$ Ceramics." *Journal of the American Ceramic Society* 92.8 (2009): 1719-1724.

\* cited by examiner

FIG. 1

| COMPOSITION (x) | PRE-FIRING CONDITION | | FIRING CONDITION | | ANNEALING CONDITION | | RELATIVE DENSITY (%) |
|---|---|---|---|---|---|---|---|
| | TEMPERATURE (°C) | TIME (hr) | TEMPERATURE (°C) | TIME (hr) | TEMPERATURE (°C) | TIME (hr) | |
| 0 | 1000 | 4 | 1350 | 2 | 1100 | 7 | 90.7 |
| 0.05 | 1000 | 4 | 1200 | 2 | 1100 | 7 | 85.9 |
| 0.1 | 1000 | 4 | 1250 | 2 | 1100 | 7 | 97.4 |
| 0.2 | 1000 | 4 | 1200 | 2 | 1100 | 7 | 91.8 |
| 0.4 | 900 | 4 | 1200 | 2 | 1100 | 7 | 85.8 |
| 0.6 | 900 | 4 | 1000 | 2 | — | — | 92.5 |

FIG. 2

| COMPOSITION (x) | PERMITTIVITY | | | | CURIE TEMPERATURE (TC) | PERMITTIVITY CHANGE RATIO (%) | LEAKAGE CURRENT DENSITY (A/cm²) | |
|---|---|---|---|---|---|---|---|---|
| | 25°C | 200°C | 300°C | 400°C | | | LOW ELECTRIC FIELD (15kV/cm) | HIGH ELECTRIC FIELD (60kV/cm) |
| 0 | 2193 | 2838 | 1637 | 1361 | 121 | 52.0 | $1.79 \times 10^{-5}$ | $1.56 \times 10^{-3}$ |
| 0.05 | 4144 | 1646 | 1034 | 767 | 34 | 53.4 | $4.91 \times 10^{-9}$ | $6.99 \times 10^{-8}$ |
| 0.1 | 674 | 724 | 617 | 510 | 95 | 29.6 | $4.33 \times 10^{-9}$ | $6.00 \times 10^{-9}$ |
| 0.2 | 668 | 719 | 591 | 496 | 104 | 31.0 | $3.28 \times 10^{-9}$ | $4.19 \times 10^{-9}$ |
| 0.4 | 422 | 758 | 722 | 670 | 167 | 11.6 | $9.86 \times 10^{-10}$ | $3.86 \times 10^{-9}$ |
| 0.5 | 325 | 762 | 754 | 705 | 223 | 7.5 | | |
| 0.6 | 217 | 787 | 815 | 806 | 261 | 2.4 | $1.42 \times 10^{-9}$ | $6.82 \times 10^{-9}$ |
| 0.7 | 184 | 793 | 810 | 823 | 284 | 3.8 | | |

FIG. 8

| COMPOSITION (x) | PRE-FIRING CONDITION | | FIRING CONDITION | | ANNEALING CONDITION | | RELATIVE DENSITY (%) |
|---|---|---|---|---|---|---|---|
| | TEMPERATURE (°C) | TIME (hr) | TEMPERATURE (°C) | TIME (hr) | TEMPERATURE (°C) | TIME (hr) | |
| 0.2 | 1100 | 4 | 1300 | 2 | — | — | 86.4 |
| 0.4 | 1100 | 4 | 1300 | 2 | — | — | 76.9 |
| 0.4 (HIGH DENSITY) | 1000 | 4 | 1200 | 2 | — | — | 94.2 |
| 0.5 | 1000 | 4 | 1100 | 2 | — | — | 95.3 |

FIG. 9

| COMPOSITION (x) | PERMITTIVITY | | | | CURIE TEMPERATURE [°C] TC(1MHz) | PERMITTIVITY CHANGE RATIO (200°C~400°C) | PERMITTIVITY CHANGE RATIO (R.T.~400°C) | LEAKAGE CURRENT DENSITY (A/cm$^2$) LOW ELECTRIC FIELD (15kV/cm) |
|---|---|---|---|---|---|---|---|---|
| | 25°C | 200°C | 300°C | 400°C | | | | |
| 0.2 | 747 | 860 | 748 | 639 | 112 | 30.6% | 30.6% | $4.81 \times 10^{-9}$ |
| 0.4 | 337 | 464 | 441 | 415 | 148 | 10.6% | 30.0% | $9.70 \times 10^{-10}$ |
| 0.4 (HIGH DENSITY) | 390 | 725 | 694 | 657 | 173 | 3.8% | 46.5% | $5.43 \times 10^{-10}$ |
| 0.5 | 239 | 651 | 641 | 623 | 216 | 4.4% | 63.3% | $4.30 \times 10^{-8}$ |

CERAMIC MATERIAL AND ELECTRONIC DEVICE

CROSS REFERENCE TO RELATED APPLICATIONS

The present application is based on and claims priority to Japanese Patent Application No. 2009-159705 filed on Jul. 6, 2009, the contents of which are incorporated in their entirety herein by reference.

BACKGROUND OF THE INVENTION

1. Field of the Invention

The present invention relates to a ceramic material having a perovskite structure. The present invention also relates to an electronic device and more particularly to a capacitor intended for high temperature applications.

2. Description of the Related Art

Conventionally, an SiC integrated circuit that can operate in a high temperature about from 25° C. to 400° C. is used in a hard condition such as a vehicle. The SiC integrated circuit includes a capacitor, and the capacitor includes a dielectric layer made of a high-permittivity material.

The high-permittivity material is broadly classified into a high-permittivity gate insulating material represented by a $SiO_2$-based material and a $HfO_2$-based material (hereinafter called the material 1) and a perovskite-type oxide represented by $BaTiO_3$ (hereinafter called the material 2). Regarding the material 2, a temperature stability of permittivity can be improved by replacing a part of Ba with Sr as described in A. D. Hilton and B. W. Ricketts, J. Phys. D: Appl. Phys., 29 (1996) 1321-1325.

The material 1 has a difficulty that the permittivity is as small as 10 to 20. The material 2 has a difficulty that the permittivity greatly changes with temperature, that is, the temperature stability of permittivity is low.

SUMMARY OF THE INVENTION

In view of the foregoing problems, it is an object of the present invention to provide a ceramic material having a high permittivity and a high temperature stability of permittivity. Another object of the present invention is to provide a capacitor using the ceramic material.

A ceramic material according to a first aspect of the present invention has a perovskite structure and is represented by formula of $(1-x)ABO_3\text{-}xYZO_3$. In the formula, "x" is a real number that is greater than 0 and is less than 1, each of "A," "B," "Y," and "Z" is one or more kinds selected from a plurality of metal ions M other than a Pb ion and alkali metal ions, "A" is bivalent, "B" is tetravalent, "Y" is trivalent or combination of trivalent metal ions, and "Z" is bivalent and/or trivalent metal ions, or a bivalent and/or pentavalent metal ions. It can be a combination of at least two metal ions of out which one is always a bivalent metal ion. The ceramic material can have a high permittivity and a high temperature stability of permittivity.

A capacitor according to a second aspect of the present invention includes a dielectric layer made of the ceramic material according to the first aspect. Because the ceramic material has a high permittivity and a high temperature stability of permittivity, the capacitor can have a high permittivity and a high temperature stability of permittivity.

BRIEF DESCRIPTION OF THE DRAWINGS

Additional objects and advantages of the present invention will be more readily apparent from the following detailed description of exemplary embodiments when taken together with the accompanying drawings. In the drawings:

FIG. 1 is a diagram showing manufacturing conditions of ceramic materials according to a first embodiment of the present invention and a comparative example;

FIG. 2 is a diagram showing evaluation results of the ceramic materials according to the first embodiment and the comparative example;

FIG. 8 is a diagram showing manufacturing conditions of ceramic materials according to a first embodiment example of $(1-X) BaTiO_3\text{-}X Bi(Mg_{1/2}Zn_{1/2})O_3$;

FIG. 9 is a diagram showing evaluation results of the ceramic materials according to the first embodiment example of $(1-X) BaTiO_3\text{-}X Bi(Mg_{1/2}Zn_{1/2})O_3$;

Figure 3:
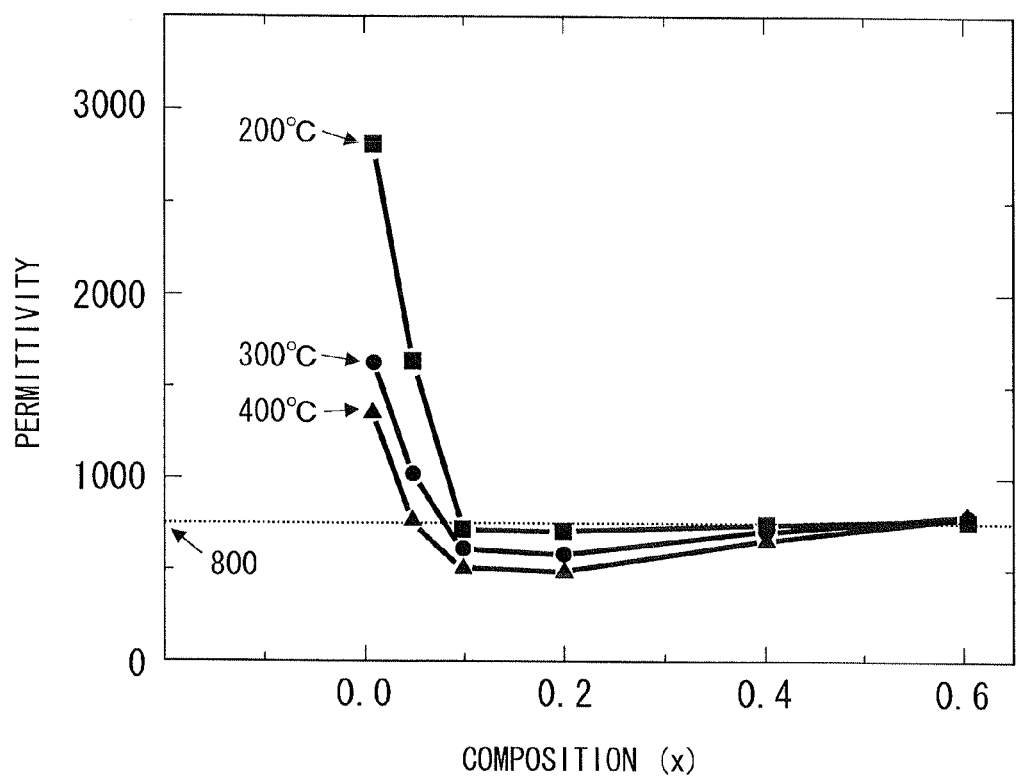
FIG. 3 is a graph showing a relationship between a value of "x" and permittivities measured at 200° C., 300° C., and 400° C. with a measurement frequency of 1 MHz.

DETAILED DESCRIPTION OF THE EXEMPLARY EMBODIMENTS (First Embodiment)

A ceramic material according to a first embodiment of the present invention is represented by formula (1):

$$(1-x)BaTiO_3\text{-}xBi(Mg_{2/3}Nb_{1/3})O_3 \quad (1)$$

wherein, "x" represents a molar ratio of $Bi(Mg_{2/3}Nb_{1/3})O_3$ to the whole amount of the ceramic material. Thus, "x" is a real number that is greater than 0 and is less than 1. Ceramic materials are manufactured as follows for respective cases that "x" is 0, 0.05, 0.1, 0.2, 0.4, 0.5, 0.6, and 0.7. The ceramic material of x=0 is a comparative example.

First, $BaCO_3$, $Bi_2O_3$, $TiO_2$, MgO, and $Nb_2O_5$, which are materials, are weighed and are put into a plastic jar with balls, and ethanol is added. Then, the materials are mixed by being treated with a ball mill. The amount of each of the materials is determined in such a manner that a ratio of Ba, Bi, Ti, Mg, and Nb corresponds to a stoichiometric proportion in the formula (1).

After evaporating ethanol the materials are put into an alumina crucible, and are pre-fired in a muffle furnace. A pre-firing temperature is a temperature from 900° C. to 1000° C. and a pre-firing time is 4 hours. The pre-firing is performed in air. The materials become powder by being pre-fired Ethanol is added to the powder, and the powder is crushed with a ball mill.

After evaporating ethanol, a pellet is molded from the powder by known uniaxial pressurizing A pressurizing condition is 0.5 tf/cm$^2$ and 5 minutes. The pellet is put into a bag and is treated with an isotropic pressurizing in a cold isostatic pressing apparatus (CIP apparatus). A pressurizing condition is 150 MPa and 30 minutes.

The pellet is fired in air at a temperature from 1000° C. to 1350° C. for 4 hours. Then, the pellet is annealed in air at 1100° C. for 7 hours, and thereby the ceramic material is formed.

A pre-firing condition and a firing condition are set for each value of "x." The pre-firing conditions, the firing conditions, annealing conditions, relative densities of the formed ceramic materials are shown in FIG. 1.

The temperature at the pre-firing is set to be as low as possible within a range where the ceramic material becomes a single phase. The temperature at the firing is set to be as high as possible within a range where a density of the ceramic material becomes sufficiently high.

The ceramic materials formed by the above-described method are evaluated as follows. First, a thin plate having a thickness of 0.3 mm is cut out from the pellet of each of the ceramic materials, and the thin plate is polished on a polishing plate using polishing powder. On two sides of the polished thin plate, gold electrode layers are formed by sputtering. Each of the electrode layers is coupled with one end of a Pt line using Ag paste, and thereby a sample is formed.

The sample is set in an infrared lamp furnace. The other end of each of the Pt lines (an end on an opposite side of the end coupled with each of the electrode layers) is coupled with a measuring device such as an impedance analyzer, and a capacitance "C" is measured. Then, a permittivity "∈" is calculated from the following formula (2). In the formula (2), "S" is an electrode'area, that is, an area of the thin plate, and "d" is an electrode interval, that is, a thickness of the thin plate.

For example, "d" is a value within a range from 0.2 mm to 0.3 mm, and "S" is a value less than or equal to 0.3 cm$^2$.

$$C=\in \cdot S/d \quad (2)$$

Permittivities are measured at a plurality of temperatures within a range from 25° C. to 400° C. with measurement frequencies of 1 kHz, 3 kHz, 10 kHz, 30 kHz, 100 kHz, 300 kHz, and 1 MHz.

In FIG. 2, permittivities measured at 25° C., 200° C., 300° C., and 400° C. with the measurement frequency of 1 MHz, a curie temperature, a ratio of change in permittivity, and leakage current densities are shown for each of the samples in which the value of "x" is 0, 0.05, 0.1, 0.2, 0.5, 0.6, and 0.7. The ratio of change in permittivity is a ratio of the permittivity measured at 400° C. to the permittivity measured at 200° C.

A relationship between the values of "x" and the permittivities measured at 200° C., 300° C., and 400° C. with the measurement frequency of 1 MHz is shown in FIG. 3.

As shown in FIG. 2 and FIG. 3, in each of the samples in which the value of "x" is greater than 0, the ratio of change in permittivity and the leakage current densities are small compared with the ratio of change in permittivity and the leakage current densities of the sample in which the value of "x" is 0. Especially, when the value of "x" is greater than or equal to 0.1, the ratio of change in permittivity is effectively reduced while keeping a high permittivity.

Figure 4:
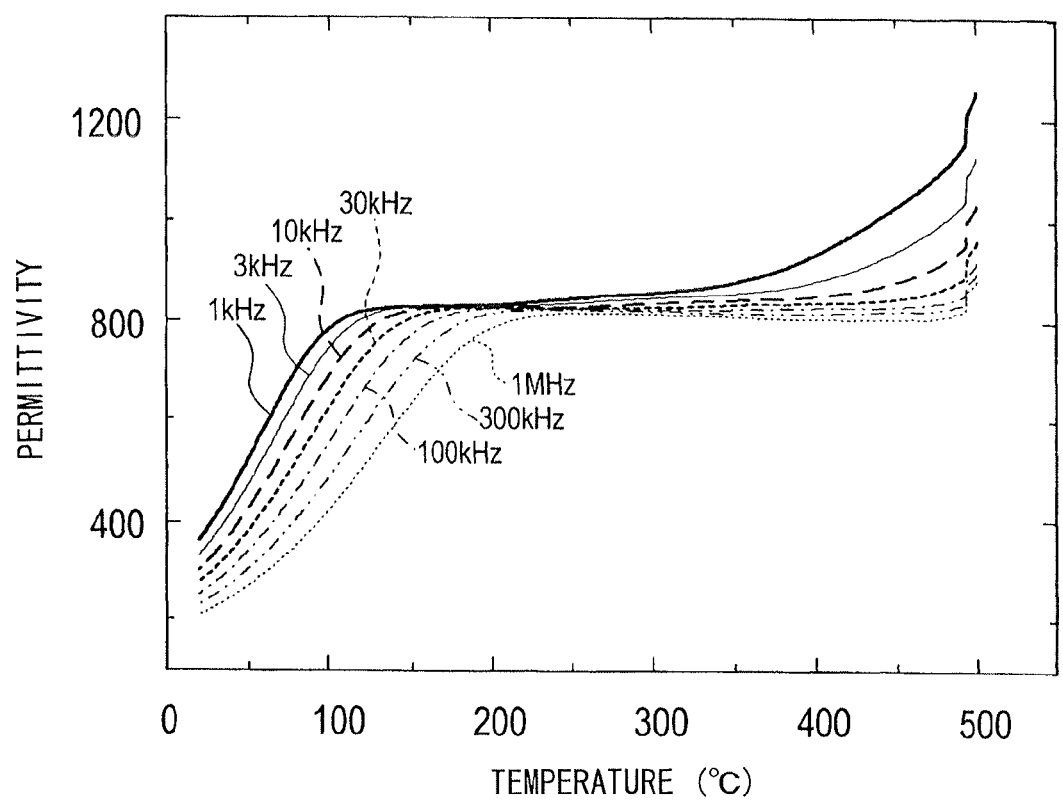
FIG. 4 is a graph showing a relationship between a temperature and permittivities of a sample of x=0.6 measured with various measurement frequencies.
Figure 5:
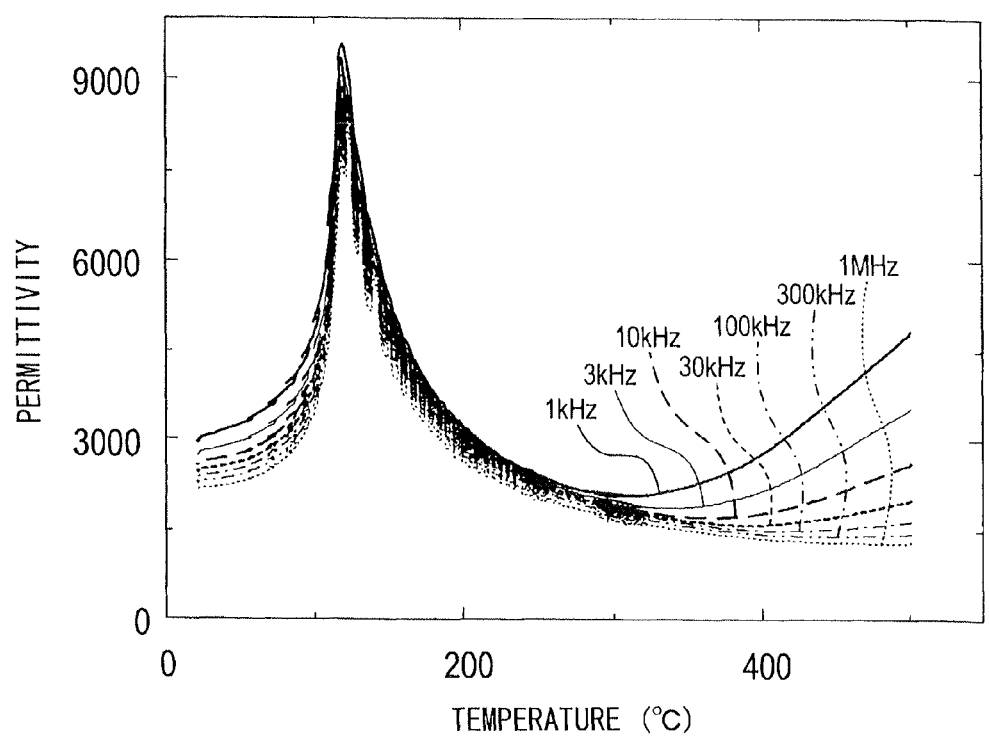
FIG. 5 is a graph showing a relationship between a temperature and permittivities of a sample of x=0 measured with various measurement frequencies.
Figure 6A:
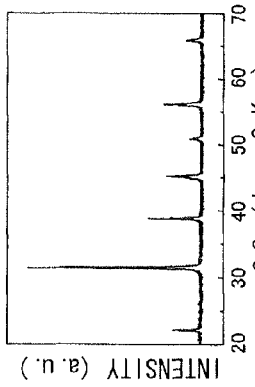
FIG. 6A is a graph showing X-ray diffraction data of a sample of x=0.
Figure 6B:
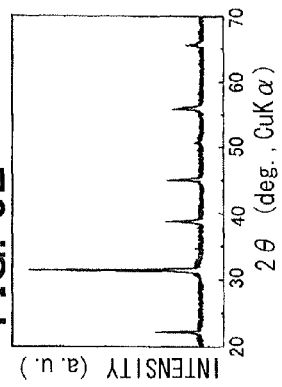
FIG. 6B is a graph showing X-ray diffraction data of a sample of x=0.05.
Figure 6C:
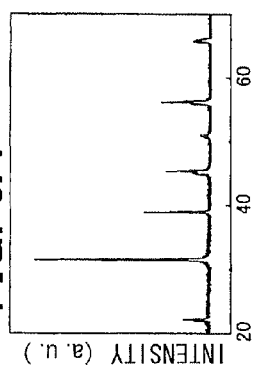
FIG. 6C is a graph showing X-ray diffraction data of a sample of x=0.1.
Figure 6D:
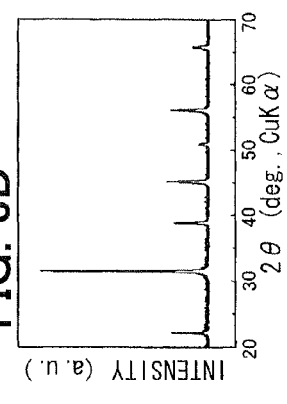
FIG. 6D is a graph showing X-ray diffraction data of a sample of x=0.2.
Figure 6E:
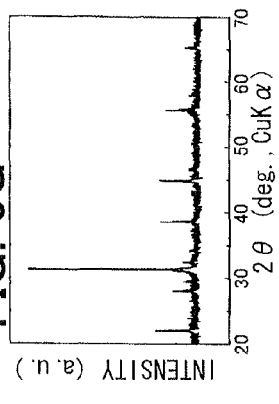
FIG. 6E is a graph showing X-ray diffraction data of a sample of x=0.4.
Figure 6F:
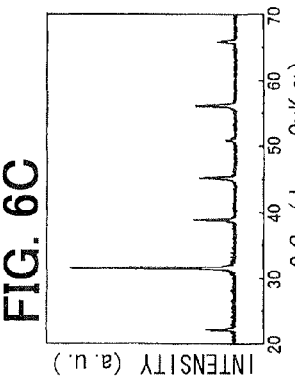
FIG. 6F is a graph showing X-ray diffraction data of a sample of x=0.6.
Figure 6G:
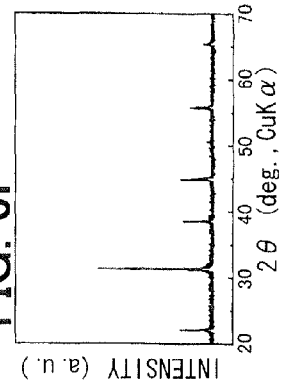
FIG. 6G is a graph showing X-ray diffraction data of a sample of x=0.7.

FIG. 4 shows a relationship between temperature and permittivities of the sample of x=0.6 measured with the measurement frequencies of 1 kHz, 3 kHz, 10 kHz, 30 kHz, 100 kHz, 300 kHz, and 1 MHz. FIG. 5 shows a relationship between temperature and the permittivities of the sample of x=0 measured with the measurement frequencies of 1 kHz, 3 kHz, 10 kHz, 30 kHz, 100 kHz, 300 kHz, and 1 MHz. As is obvious from FIG. 4 and FIG. 5, in the sample of x=0.6, even when the measurement frequency changes, the temperature dependency of permittivity is difficult to change compared with the sample of x=0.

X-ray diffraction data of samples of x=0, 0.05, 0.1, 0.2, 0.5, 0.6, and 0.7 are shown in FIG. 6A, FIG. 6B, FIG. 6C, FIG. 6D, FIG. 6E, FIG. 6F, and FIG. 6G, respectively. As is obvious from FIG. 6A-FIG. 6G, each of the samples is a signal phase and has a perovskite structure although peaks of impurities slightly remain in the X-ray diffraction data of the sample of x=0.7.

As described above, the ceramic material according to the present embodiment has a high permittivity and a high temperature stability of permittivity. In addition, the temperature dependency of permittivity is difficult change even when the measurement frequency changes Furthermore, because the ceramic material includes substantially no Pb ion and no alkali metal ion, even when applied to the semiconductor process, a problem is difficult to arise. "Including substantially no Pb ion and no alkali metal ion" means that the ceramic material may include a Pb ion and alkali metal ions as long as the amount of the Pb ion and the alkali metal ions is too small'to suppress the above-described effects.

Because the ceramic material according to the present embodiment has the above-described effects, the ceramic material can be used as a dielectric layer of a capacitor. The capacitor may include a plurality of dielectric layers made of the ceramic material and a plurality of internal electrode layers, and the dielectric layers and the internal electrode layers may be alternately stacked. The internal electrode layer may include a conductive Ni alloy. The ceramic material according to the present embodiment can also be used for various electronic devices other than the capacitor.

The ceramic material according to the present embodiment may be modified so as to have a structure represent by formula (3):

$$(1-x)BaTiO_3 - xBi(Ni_{2/3}Nb_{1/3})O_3 \quad (3)$$

wherein, "x" is a real number that is greater than 0 and is less than 1. In the formula (3), $Mg^{2+}$ in the formula (1) is changed into $Ni^{2+}$. The ceramic material having the structure represented by the formula (3) can have effects substantially similar to the ceramic material represented by the formula (1). Especially when the value of "x" is greater than or equal to 0.5, the ceramic material can have a high permittivity and a high temperature stability of permittivity.

The ceramic materials are manufactured for respective cases that "x" is 0.05, 0.1, 0.2, 0 3, 0.4 and 0.5. The high density ceramic material is difficult to realized in without excess of Bi metal ions. Excess Bi is needed to prepare the high density ceramic pallets of structure shown in formula (3). Therefore, the present embodiment may be modified so as to have a structure represent by formula (4):

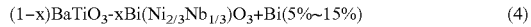

$$(1-x)BaTiO_3 - xBi(Ni_{2/3}Nb_{1/3})O_3 + Bi(5\% \sim 15\%) \quad (4)$$

Figure 7:
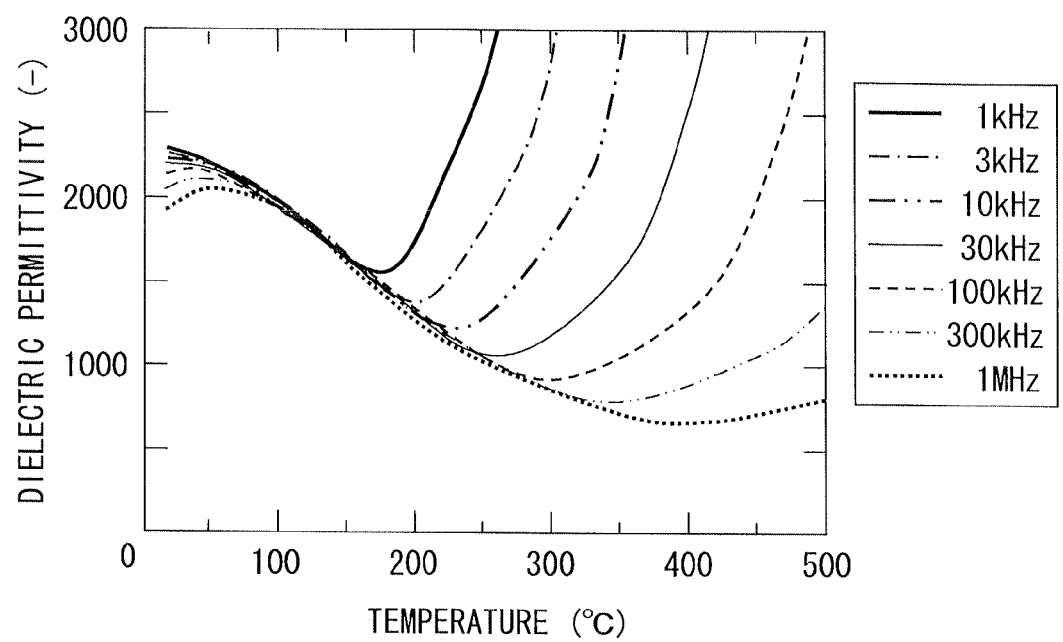
FIG. 7 is a graph showing a relationship between a temperature and permittivities of a sample of x=0.05 with 5% Bi metal ion according to a first embodiment example of $(1-X)BaTiO_3\text{-}X Bi(Ni_{2/3}Nb_{1/3})O_3+Bi\ 5\%$.
Figure 10A:
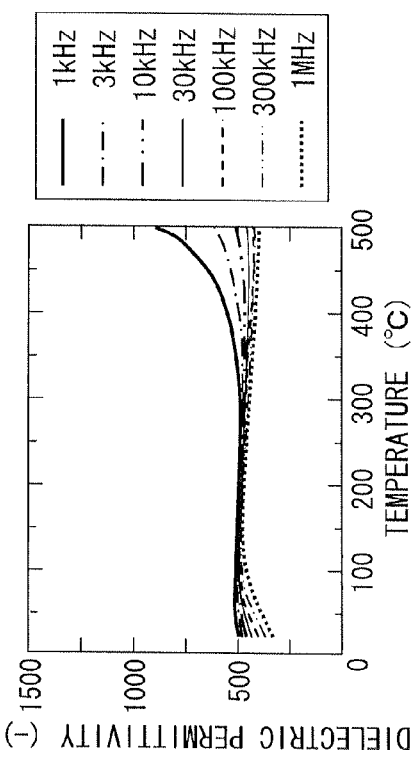
FIG. 10A is a graph showing a relationship between a temperature and permittivities of a sample of x=0.2 measured with various measurement frequencies.
Figure 10C:
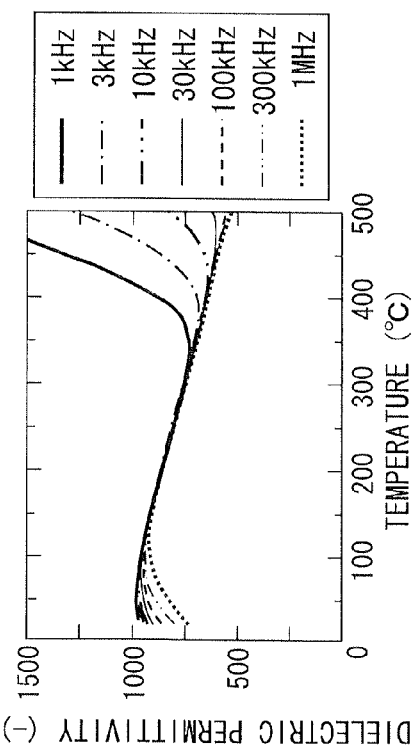
FIG. 10C is a graph showing a relationship between a temperature and permittivities of a sample of x=0.4 (high density) measured with various measurement frequencies.
Figure 10B:
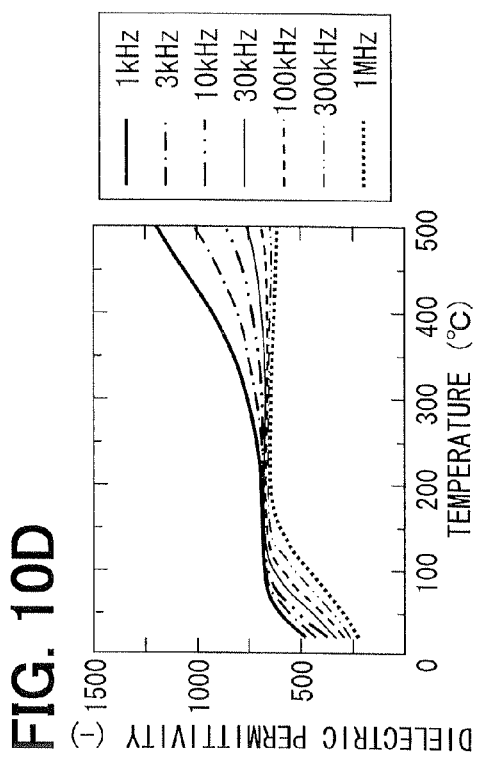
FIG. 10B is a graph showing a relationship between a temperature and permittivities of a sample of measured with various measurement frequencies.
Figure 10D:
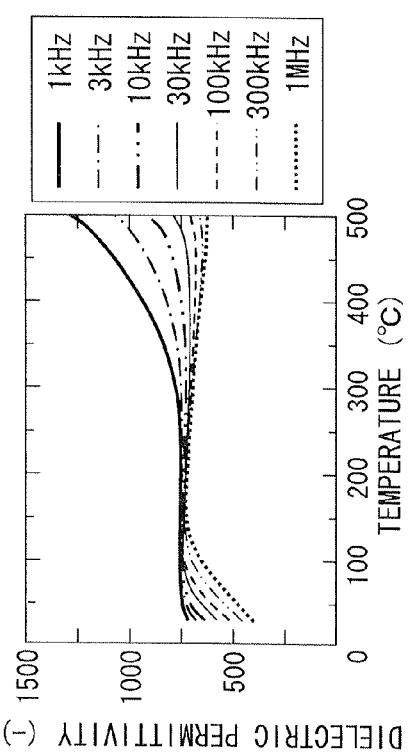
FIG. 10D is a graph showing a relationship between a temperature and permittivities of a sample of x=0.5 measured with various measurement frequencies.
Figure 11A:
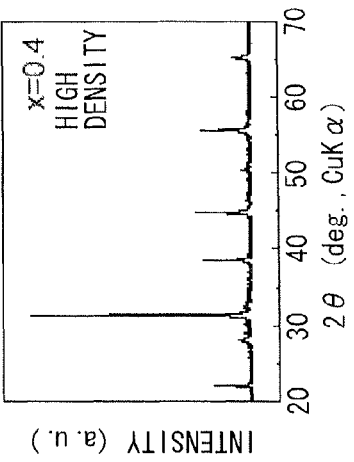
FIG. 11A is a graph showing X-ray diffraction data of a sample of x=0.2.
Figure 11B:
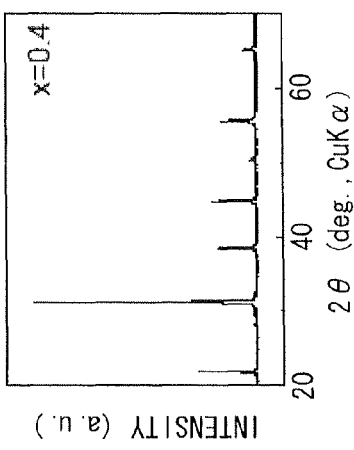
FIG. 11B is a graph showing X-ray diffraction data of a sample of x=0.4.
Figure 11C:
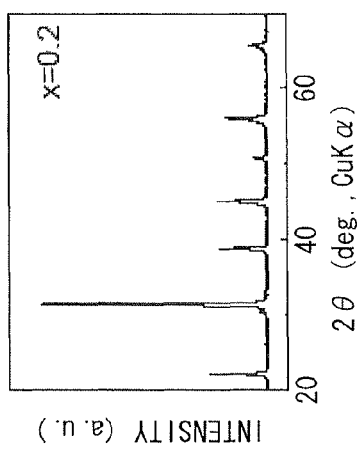
FIG. 11C is a graph showing X-ray diffraction data of a sample of x=0.4 (High Density)
Figure 11D:
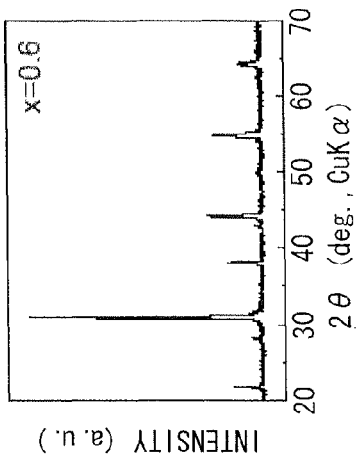
FIG. 11D is a graph showing X-ray diffraction data of a sample of x=0.5.
Figure 11E:
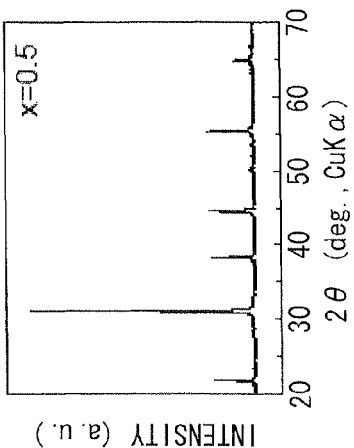
FIG. 11E is a graph, showing X-ray diffraction data of a sample of x=0.6.

FIG. 7 shows a relationship between temperature and permittivities measurement frequencies of 1 kHz, 3 kHz, 10 kHz, 30 kHz, 100 kHz, 300 kHz, and 1 MHz of the sample of x=0.05 and $Bi^{3+}$ is excess of 5% the whole amount of the ceramic material. As shown in FIG. 7, the replacement of Mg metal ion with Nickel metal ion can increase the values of the dielectric permittivity, however, it shows strong temperature and frequency dependent characteristics. More complex composition of more than two component may require to stabilize the observed strong temperature and frequency dependent characteristics.

The ceramic material according to the present embodiment may be modified so as to have a structure represent by formula (5):

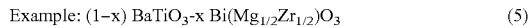

$$\text{Example: } (1-x) BaTiO_3 - x Bi(Mg_{1/2}Zr_{1/2})O_3 \quad (5)$$

wherein, "x" is a real number that is greater than 0 and is less than 1. In the formula (5), $Nb^{3+}(1)$ is changed into $Zr^{4+}$. Ceramic materials are manufactured as follows for respective cases that "x" is 0.2, 0.4, 0.4 (high density), 0.5, and 0.6. The pre-firing conditions, the firing conditions, relative densities of the formed ceramic materials are shown in FIG. 8.

In FIG. 9, permittivities measured at 25° C., 200° C. 300° C., and 400° C. with the measurement frequency of 1 MHz, a curie temperature, a ratio of change in permittivity, and leakage current densities are shown for each of the samples in which the value of "X" is 0.2, 0.4, 0.4 (high density), and 0.5. The ratio of change in permittivity is a ratio of the permittivity measured at 400° C. to the permittivity measured at 200° C.

FIG. 10A to FIG. 10D show a relationship between temperature and permittivities and the dielectric losses of the sample of x=0.2, 0.4, 0.4 (high density), and 0.5 measured with the measurement frequencies of 1 kHz, 3 kHz, 10 kHz, 30 kHz, 100 kHz, 300 kHz, and 1 MHz. As shown in FIG. 10A to FIG. 10D, in each of the samples in which the value of "x" is greater than 0.2, the ratio of change in permittivity is small compared with the ratio of change in permittivity and the leakage current densities of the sample in which the value of "x" is 0.2. When the value of "x" is greater than or equal to 0.5, the ratio of change in permittivity is effectively same while keeping a high permittivity but the leakage current is relatively increased.

X-ray diffraction data of samples of x=0.2, 0.4, 0.4 (high density), 0.5, and 0.6 are shown in FIG. 11A, FIG. 11B, FIG. 11C, FIG. 11D, and FIG. 11E, respectively. As is obvious from FIG. 11A-FIG. 11E, each of the samples is a signal phase and has a perovskite structure although peaks of impurities slightly remain in the X-ray diffraction data of the sample of x=0.6.

The ceramic material according to the present embodiment may be modified so as to have a structure represent by formula (6):

$$(1-x)BaTiO_3 - xBi(Zn_{1/2}Zr_{1/2})O_3 \quad (6)$$

wherein, "x" is a real number that is greater than 0 and is less than 1. In the formula (6), $Mg^{2+}$ and $Nb^{3+}$ in the formula (1) is changed into Zn2+ and $Zr^{4+}$. The ceramic material having the structure represented by the formula (6) can have effects substantially similar to the ceramic material represented by the formula (1, 3, 5). Especially when the value of "x" is greater than or equal to 0.2 and less than or equal to 0.5 ($0.2 \leq x \leq 0.5$) the ceramic material can have a high permittivity and a high temperature stability of permittivity.

(Second Embodiment)

A ceramic material according to a second embodiment of the present invention is represented by formula (7):

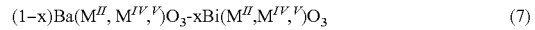

$$(1-x)Ba(M^{II}, M^{IV,V})O_3 - xBi(M^{II}, M^{IV,V})O_3 \quad (7)$$

wherein, "x" is a real number that is greater than 0 and is less than 1, $M^{II}$ is a bivalent metal ion, $M^{IV}$ is a tetravalent metal ion, and $M^V$ is a pentavalent metal ion. $(M^{II}, M^{IV,V})$ means a combination of the bivalent metal ion $M^{II}$ and the tetravalent metal ion $M^{IV}$ or a combination of the bivalent metal ion $M^{II}$ and the pentavalent metal ion $M^V$. In the formula (7), an average valence of $(M^{II}, M^{IV,V})$ described just after Ba is 4 and an average valence of $(M^{II}, M^{IV,V})$ described just after Bi is 3. Each of the metal ions $M^{II}$, $M^{IV}$, and $M^V$ is neither a Pb ion nor an alkali metal ions.

The bivalent metal ion $M^{II}$ is one or more kinds selected from a group consisting of $Mg^{2+}$, $Ni^{2+}$, and $Zn^{2+}$. The tetravalent metal ion $M^{IV}$ is one or more kinds selected from a group consisting of $Ti^{4+}$ and $Zr^{4+}$. The pentavalent metal ion $M^V$ is one or more kinds selected from a group consisting of $Nb^{5+}$ and $Ta^{5+}$.

The ceramic material according to the present embodiment can be manufactured in a manner basically similar to the ceramic material according to the first embodiment. However, kinds of materials and a compounding ratio are adjusted based on a stoichiometric Proportion of a manufacturing ceramic material.

The ceramic material according to the present embodiment has a perovskite structure and produces effects substantially similar to the effects of the ceramic material according to the first embodiment.

Third Embodiment

A ceramic material according to a third embodiment of the present invention is represented by formula (8):

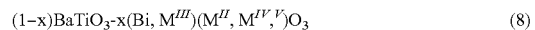

$$(1-x)BaTiO_3 - x(Bi, M^{III})(M^{II}, M^{IV,V})O_3 \quad (8)$$

wherein, "x" is a real number that is greater than 0 and is less than 1, $M^{II}$ is a bivalent metal ion, $M^{III}$ is a trivalent metal ion $M^{IV}$ is a tetravalent metal ion, and $M^V$ is a pentavalent metal ion. $(Bi, M^{III})$ means a combination of $Ba^{3+}$ and the trivalent metal ion $M^{III}$ other than $Bi^{3+}$. In addition, $(M^{II}, M^{IV,V})$ means a combination of the bivalent metal ion $M^{II}$ and the tetravalent metal ion $M^{IV}$ or a combination of the bivalent metal ion $M^{II}$ and the pentavalent metal ion $M^V$. In the formula (5), an average valence of $(M^{II}, M^{IV,V})$ described just after $(Bi, M^{III})$ is 3. Each of the metal ions $M^{II}$, $M^{III}$, $M^{IV}$, and $M^V$ is neither a Pb ion nor alkali metal ions.

The bivalent metal ion $M^{II}$ is one or more kinds selected from a group consisting of $Mg^{2+}$, $Ni^{2+}$, and $Zn^{2+}$. The trivalent metal ion $M^{III}$ is a rare earth (RE) and is one or more kinds selected from a group consisting of $La^{3+}$, $Nd^{3+}$, and $Sm^{3+}$. In $(Bi, M^{III})$, the trivalent metal ion $M^{III}$ accounts for, for example, greater than or equal to 10% in molar ratio. When the trivalent metal ion $M^{III}$ accounts for greater than or equal to 10% in molar ratio, the temperature change in permittivity can be effectively reduced. The tetravalent metal ion $M^{IV}$ is one or more kinds selected from a group consisting of $Ti^{4+}$ and $Zr^{4+}$. The pentavalent metal ion $M^V$ is one or more kinds selected from a group consisting of $Nb^{5+}$ and $Ta^{5+}$.

The ceramic material according to the present embodiment can be manufactured in a manner basically similar to the ceramic material according to the first embodiment. However, kinds of materials and a compounding ratio are adjusted based on a stoichiometric proportion of a manufacturing ceramic material.

The ceramic material according to the present embodiment has a perovskite structure and produces effects substantially similar to the effects of the ceramic material according to the first embodiment.

(Fourth Embodiment)

A ceramic material according to a fourth embodiment of the present invention is represented by formula (9):

$$(1-x)Ba(M^{II}, M^{IV,V})O_3 - X(Bi, M^{III})(M^{IV,V})O_3 \qquad (9)$$

wherein "x" is a real number that is greater than 0 and is less than 1, $M^{II}$ is a bivalent metal ion, $M^{III}$ is a trivalent metal ion, $M^{IV}$ is a tetravalent metal ion, $M^{V}$ is a pentavalent metal ion. (Bi, $M^{III}$) means a combination of $Ba^{3+}$ and the trivalent metal ion $M^{III}$ other than $Bi^{3+}$. In addition, ($M^{II}$, $M^{IV,V}$) means a combination of the bivalent metal ion $M^{II}$ and the tetravalent metal ion $M^{IV}$ or a combination of the bivalent metal ion $M^{II}$ and the pentavalent metal ion $M^{V}$. In the formula (6), an average valence of ($M^{II}$, $M^{IV,V}$) described just after Ba is 4 and an average valence of ($M^{II}$, $M^{IV,V}$) described just after (Bi, $M^{III}$) is 3. Each of the metal ions $M^{II}$, $M_{III}$, $M^{IV}$, and $M^{V}$ is neither Pb ion nor alkali metal ions.

The bivalent metal ion $M^{II}$ is one or more kinds selected from a group consisting of $Mg^{2+}$, $Ni^{2+}$, and $Zn^{2+}$ The trivalent metal ion $M^{III}$ is a rare earth (RE) and is one or more kinds selected from a group consisting of $La^{3+}$, $Nd^{3+}$, and $Sm^{3+}$ In (Bi, $M^{III}$), the trivalent metal ion $M^{III}$ accounts for, for example, greater than or equal to 10% in molar ratio. When the trivalent metal ion $M^{III}$ accounts for greater than or equal to 10% in molar ratio, the temperature change in permittivity is effectively reduced. The tetravalent metal ion $M^{IV}$ is one or more kinds selected from a group consisting of $Ti^{4+}$ and $Zr^{4+}$. The pentavalent metal $M^{V}$ is one or more kinds selected from a group consisting of $Nb^{5+}$ and $Ta^{5+}$.

The ceramic material according to the present embodiment can be manufactured in a manner basically similar to the ceramic material according to the first embodiment. However, kinds of materials and a compounding ratio are adjusted based on a stoichiometric proportion of a manufacturing ceramic material.

The ceramic material according to the present embodiment has a perovskite structure and produces effects substantially similar to the effects of the ceramic material according to the first embodiment.

The ceramic materials according to the first to fourth embodiments can also be represented by formula (10):

$$(1-x)ABO_3 - xYZO_3 \qquad (10)$$

wherein "x" is a real number that is greater than 0 and is less than 1, each of "A," "B," "Y," and "Z" is one or more kinds selected from a plurality of metal ions M other than a Pb ion and alkali metal ions, "A" is bivalent, "B" is tetravalent, "Y" is trivalent or a combination of trivalent metal ions, and "Z" is bivalent and/or, trivalent, metal ions, or a bivalent and/or pentavalent metal ions. It can be a combination of at least two metal ions of out which one is always a bivalent metal ion. The metal ions M include the bivalent metal ion $M^{II}$, the trivalent metal ion $M^{III}$, the tetravalent metal ion $M^{IV}$, and the pentavalent metal ion $M^{V}$. The metal ions M include $Ba^{2+}$, $Mg^{2+}$, $Ni^{2+}$, $Zn^{2+}$, $Bi^{3+}$, $La_{3+}$, $Nd^{3+}$, $Sm^{3+}$, $Ti^{4+}$, $Nb^{5+}$, and $Ta^{5+}$.

Although the present invention has been fully described in connection with the exemplary embodiments thereof with reference to the accompanying drawings, it is to be noted that various changes and modifications will become apparent to those skilled in the art.

What is claimed is:

1. A ceramic material having a perovskite structure and represented by formula (1):

$$(1-x)ABO_3 - xYZO_3 \qquad (1)$$

wherein "x" is a real number that is greater than 0 and is less than 1, each of "A," "B," "Y," and "Z" is one or more kinds selected from a plurality of metal ions M other than a Pb ion and alkali metal ions, "A" is bivalent, "B" is tetravalent, "Y" is trivalent or a combination of trivalent metal ion, and "Z" is bivalent, trivalent, or pentavalent, together represents a combination of at least two metal ions.

2. The ceramic material according to claim 1, wherein "$ABO_3$" in the formula (1) forms a parent structure.

3. The ceramic material according to claim 1, wherein "A" in the formula (1) is $Ba^{2+}$ or a combination of $Ba^{2+}$ and one or more kinds selected from the plurality of the metal ions M.

4. The ceramic material according to claim 1, wherein "B" in the formula (1) is $Ti^{4+}$ or a combination of $Ti^{4+}$ and one or more kinds selected from the plurality of metal ions M.

5. The ceramic material according to claim 1, wherein the plurality of metal ions M includes a bivalent metal ion $M^{II}$, a tetravalent metal ion $M^{IV}$, and a pentavalent $M^{V}$, and "B" in the formula (1) is a combination of the bivalent metal ion $M^{II}$ and the tetravalent metal ion $M^{IV}$ or a combination of the bivalent metal ion $M^{II}$ and the pentavalent metal ion $M^{V}$.

6. The ceramic material according to claim 5, wherein the bivalent metal ion $M^{II}$ is one or more kinds selected from a group consisting of $Mg^{2+}$, $Ni^{2+}$, and $Zn^{2+}$.

7. The ceramic material according to claim 5, wherein the tetravalent metal ion $M^{IV}$ is one or more kinds selected from a group consisting of $Ti^{4+}$ and $Zr^{4+}$.

8. The ceramic material according to claim 5, wherein the pentavalent metal ion $M^{V}$ is one or more kinds selected from a group consisting of $Nb^{5+}$ and $Ta^{5+}$.

9. The ceramic material according to claim 1, wherein the plurality of metal ions M includes a trivalent metal ion $M^{III}$, "Y" in the formula (1) is $Bi^{3+}$ or a combination of $Bi^{3+}$ and the trivalent metal ion $M^{III}$.

10. The ceramic material according to claim 9, wherein the trivalent metal ion is one or more kinds selected from a group consisting of $La^{3+}$, $Nd^{3+}$, and $Sm^{3+}$.

11. The ceramic material according to claim 1, wherein the plurality of metal ions M includes a bivalent metal ion $M^{II}$, a tetravalent metal ion $M^{IV}$, and a pentavalent metal ion $M^{V}$, and "Z" in the formula (1) is a combination of the bivalent metal ion $M^{II}$ and the tetravalent metal ion $M^{IV}$ or a combination of the bivalent metal ion $M^{II}$ and the pentavalent metal ion $M^{V}$.

12. The ceramic material according to claim 11, wherein the bivalent metal ion $M^{II}$ is one or more kinds selected from a group consisting of $Mg^{2+}$, $Ni^{2+}$, and $Zn^{2+}$.

13. The ceramic material according to claim 11, wherein the tetravalent metal ion $M^{IV}$ is one or more kinds selected from a group consisting of $Ti^{4+}$ and $Zr^{4+}$.

14. The ceramic material according to claim 11 wherein the pentavalent metal ion $M^V$ is one or more kinds selected from a group consisting of $Nb^{5+}$ and $Ta^{5+}$.

15. The ceramic material according to claim 1, wherein "A" in the formula (1) is $Ba^{2+}$, "B" in the formula (1) is $Ti^{4+}$, "Y" in the formula (1) is $Bi^{3+}$, "Z" in the formula (1) is a combination of $Mg^{2+}$ and $Nb^{5+}$, and "x" in the formula (I) is greater than or equal to 0.1 ($x \geq 0.1$).

16. The ceramic material according to claim 1, wherein "A" in the formula (1) is $Ba^{2+}$, "B" in the formula (1) is $Ti^{4+}$, "Y" in the formula (1) is $Bi^{3+}$, "Z" in the formula (1) is a combination of $Ni^{2+}$ and $Nb^{5+}$, and "x" in the formula (1) is greater than or equal to 0.05 and less than or equal to 0.5 ($0.05 \leq x \leq 0.5$).

17. The ceramic material according to claim 16, wherein "x" in the formula (1) is greater than or equal to 0.05, and $Bi^{3+}$ is excess of 5% the whole amount of the ceramic material.

18. The ceramic material according to claim 1, wherein "A" in the formula (1) is $Ba^{2+}$, "B" in the formula (1) is $Ti^{4+}$, "Y" in the formula (1) is $Bi^{3+}$, "Z" the formula (1) is a combination of $Mg^{2+}$ and $Zr^{4+}$ and "x" in the formula (1) is greater than or equal to 0.2 and less than or equal to 0.5 ($0.2 \leq x \leq 0.5$).

19. The ceramic material according to claim 1, wherein "A" in the formula (1) is $Ba^{2+}$, "B" in the formula (1) is $Ti^{4+}$, "Y" in the formula (1) is $Bi^{3+}$, "Z" in the formula (1) is a combination of $Zn^{2+}$ and $Zr^{4+}$ and "x" in the formula (1) is greater than or equal to 0.2 and less than or equal to 0.5 ($0.2 \leq x \leq 0.5$).

20. The ceramic material according to claim 1, wherein the plurality of metal ions M consists of $Ba^{2+}$, $Mg^{2+}$, $Zn^{2+}$, $Bi^{3+}$, $La^{3+}$, $Nd^{3+}$, $Sm^{3+}$, $Ti^{4+}$, $Zr^{4+}$, $Nb^{5+}$, and $Ta^{5+}$.

21. A capacitor comprising a dielectric layer made of the ceramic material according to claim 1.

22. The capacitor according to claim 21, further comprising more of the dielectric layers and a plurality of internal electrode layers, wherein the dielectric layers and the internal electrode layers are alternately stacked.

23. The capacitor according to claim 22, wherein the plurality of internal electrode layers includes a conductive Ni, Ti or Ni—Ti alloy.

* * * * *

UNITED STATES PATENT AND TRADEMARK OFFICE
CERTIFICATE OF CORRECTION

| | | |
|---|---|---|
| PATENT NO. | : 8,194,392 B2 | Page 1 of 1 |
| APPLICATION NO. | : 12/830517 | |
| DATED | : June 5, 2012 | |
| INVENTOR(S) | : Malhan et al. | |

It is certified that error appears in the above-identified patent and that said Letters Patent is hereby corrected as shown below:

<u>Title page, item [73]</u>

Assignees: should read -- DENSO CORPORATION, Kariya-city Japan, and

THE UNIVERSITY OF TOKYO, Tokyo, Japan --

Signed and Sealed this
Twenty-eighth Day of August, 2012

David J. Kappos
*Director of the United States Patent and Trademark Office*